May 31, 1927.
F. L. SESSIONS
1,630,866
ELECTRIC BUTT SEAM WELDING AND APPARATUS THEREFOR
Filed Nov. 5, 1925
3 Sheets-Sheet 1
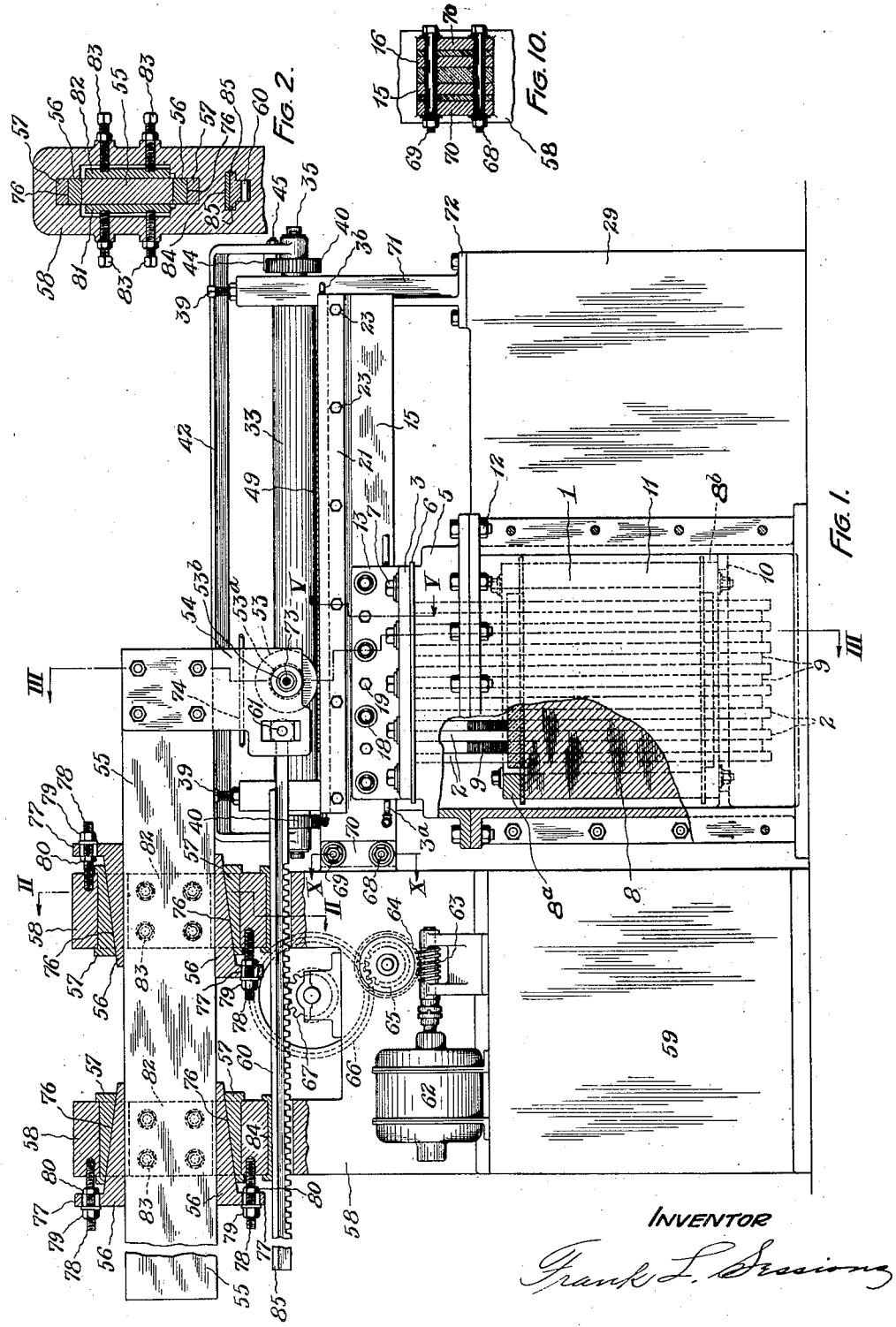
INVENTOR
Frank L. Sessions May 31, 1927. 1,630,866
F. L. SESSIONS
ELECTRIC BUTT SEAM WELDING AND APPARATUS THEREFOR
Filed Nov. 5, 1925 3 Sheets-Sheet 2
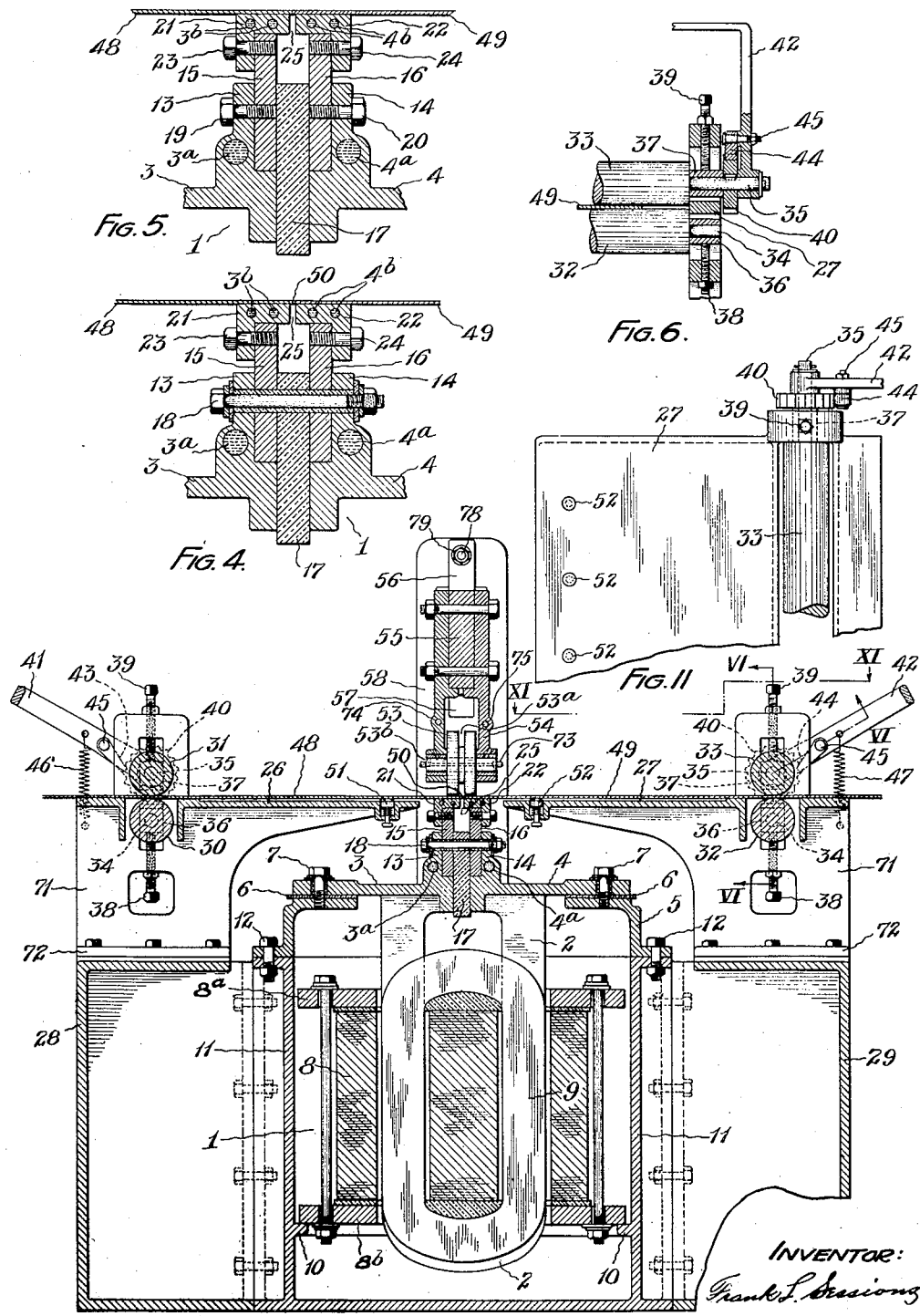
INVENTOR:
Frank L. Sessions May 31, 1927.
F. L. SESSIONS
1,630,866
ELECTRIC BUTT SEAM WELDING AND APPARATUS THEREFOR
Filed Nov. 5, 1925  3 Sheets-Sheet 3
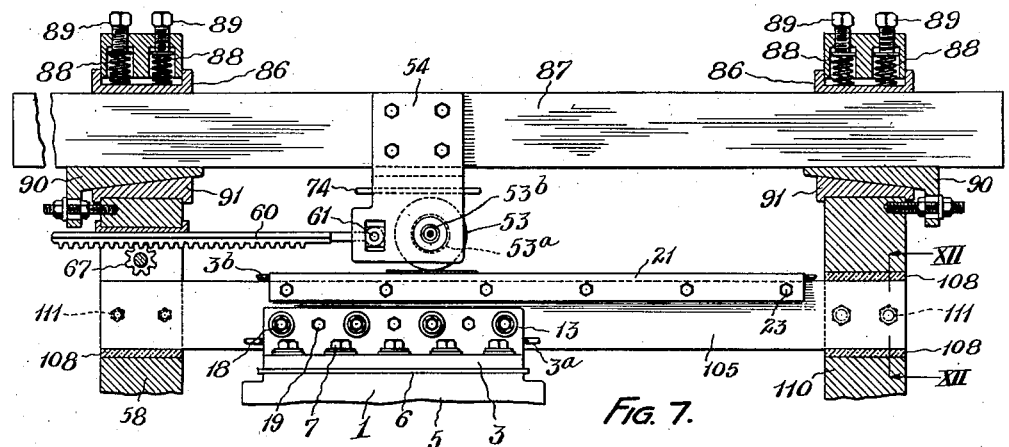
Fig. 7.
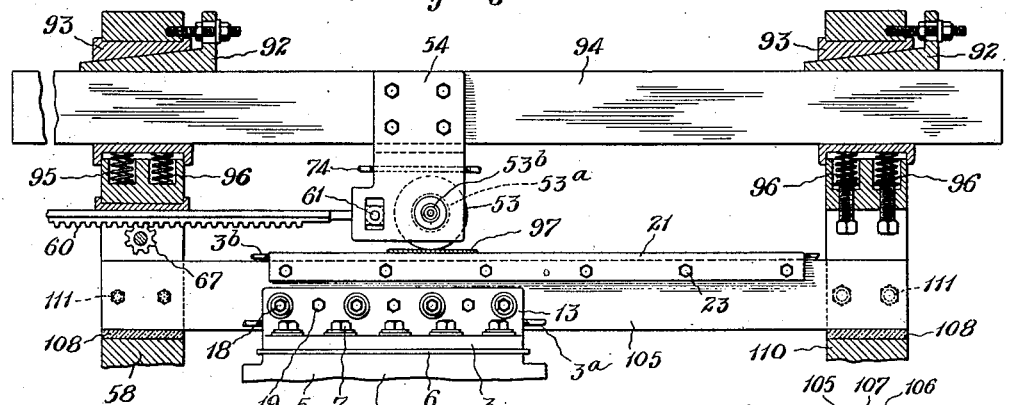
Fig. 8.
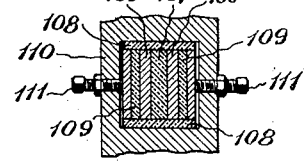
Fig. 12.
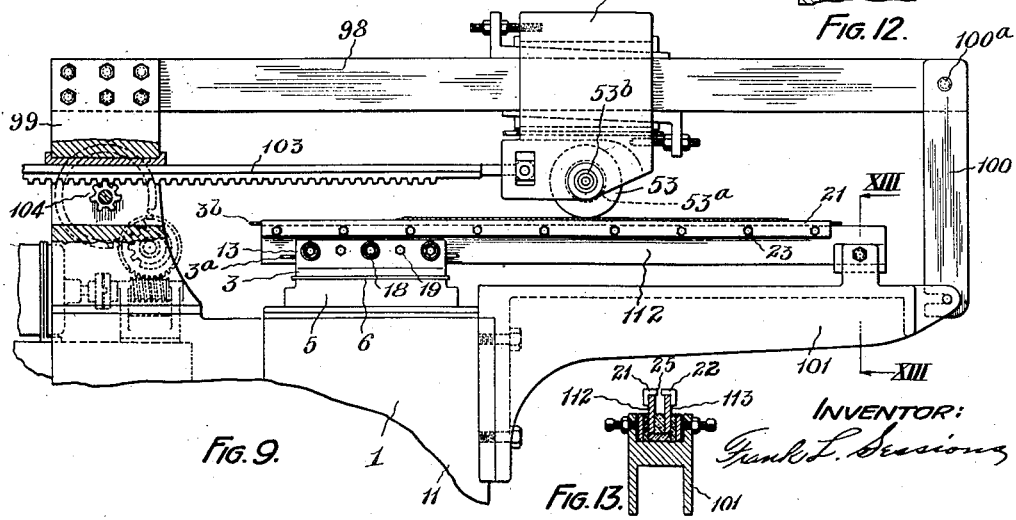
Fig. 9.
Fig. 13.
INVENTOR:
Frank L. Sessions Patented May 31, 1927.

1,630,866

UNITED STATES PATENT OFFICE.

FRANK L. SESSIONS, OF LAKEWOOD, OHIO.

ELECTRIC BUTT-SEAM WELDING AND APPARATUS THEREFOR.

Application filed November 5, 1925. Serial No. 67,063. REISSUED

Among the objects of my invention are:— the provision of a new and useful method of progressively, electrically welding together the contacting surfaces of an open butt-seam in metal; the provision of means for carrying out the above mentioned method; the provision of a progressive, electric, seam-welding machine having parallel, spaced-apart electrodes co-extensive with the seam to be welded; the provision of a progressive, electric, seam-welding machine having parallel, spaced-apart electrodes adapted to have the work disposed upon or adjacent to them with the surfaces of the seam-cleft in abutting register opposite and centrally of the space between the electrodes; the provision of means for applying localized pressure to the work upon opposite sides of the seam-cleft to press small areas of the surfaces of the work into good electrical contact with the electrodes adjacent to the seam-cleft; the provision of means for progressively moving the points of application of such localized pressure along the work parallel and adjacent to the seam-cleft; the provision of means for pressing the seam-cleft surfaces together; the provision of a progressive, electric, seam-welding machine having electrodes stationary with respect to the terminals of the electric circuit to which they are connected; the provision of a progressive, electric, seam-welding machine in which there is no relative traversing movement between the electrodes and the work longitudinally of the seam-cleft; and the provision of a progressive, electric, seam-welding machine in which the work may contact with relatively light pressure with the electrodes upon opposite sides of the seam-cleft throughout a considerable length thereof while relatively heavy pressure is applied to force the work and the electrodes into good electrical contact at localized substantially directly opposite points adjacent to the seam-cleft to cause the current flow to be largely concentrated in a narrow path or heat zone in the work across the seam-cleft between the points of localized pressure.

Heretofore it has been proposed to progressively, electrically butt-weld the contacting surfaces of an open butt-seam in metal but, so far as I am aware, parallel, spaced-apart electrodes, co-extensive with the seam to be welded have not been employed in progressive, seam welding. Instead, electrodes, usually revoluble rollers, have been employed which contact with small areas of the work on opposite sides of the seam-cleft and are moved progressively along the work parallel and adjacent to the seam-cleft.

Preferably, in my invention the electrodes are stationary, parallel, spaced-apart, conductor bars. They should be strong and well supported to properly withstand the pressure necessary to make good electrical contact between the electrodes and the work. The work is placed so that it rests upon the electrodes or closely adjacent to them with the seam-cleft surfaces pressed firmly together and disposed centrally over the space between the electrodes. Localized pressure is then applied to the work to press small surface areas of it into good electrical contact with the electrodes at two substantially immediately opposite points along the seam-cleft, adjacent to the seam-cleft. The electrodes are then energized and relative traversing movement of the localized pressure and the work is effected along and parallel with the seam-cleft. Electric current of great density is thus caused to flow in the work in a narrow path or heat zone across the seam-cleft between the surfaces of the electrodes that are subjected to the localized pressure. As the localized pressure is traversed along the seam-cleft, the heat zone moves with it and the seam is progressively welded. During the welding operation the seam-cleft surfaces should be pressed firmly together in the heat zone. This may be done by applying localized pressure to force them together at the heat zone or by pressure distributed throughout a length of the seam-cleft as described in my application Serial No. 62,543, filed October 15th, 1925.

Heretofore in progressive seam welding by the electrical resistance method, roller electrodes have been employed to traverse the work adjacent the seam-cleft while progressive localized pressure has been applied to progressively force the edges of the seam-cleft together adjacent the points of contact of the electrodes. I have found that if the seam-cleft be firmly pressed together throughout the length of the seam to be welded, a good weld can be made by causing electric welding current in suitable volume to flow across the seam-cleft at one point and traversing that point progressively along the seam-cleft. This principle of welding that I believe to be first disclosed in my above identified application, Serial No. 62,543, may be utilized in my present invention.

I do not limit my invention to the utilization of this principle as it will be obvious to those skilled in the art that localized pressure may be applied to force the surfaces of the seam-cleft together in the heat zone only, especially when welding tubes or large cylinders and employing the well known fin-like seam-guides in the open seam-cleft ahead of the welding zone that are used in tube welding machines to position and align the seam-cleft centrally between the electrodes.

Preferably the rate of progress of the localized pressure and resultant heat zone should be from 30 to 100 or more feet per minute depending upon the thickness of the work and the frequency of the alternating current employed. When using 60 cycle current, I have found that sheet steel about fifty-thousandths of an inch thick can be properly welded at from 30 to 100 feet per minute. Possibly an even greater range of speed will be found practicable under favorable conditions.

It will be understood that I do not limit my invention to a minimum speed of welding of 30 feet per minute as I am aware that progressive electric butt-seam welding has been successfully done at much slower speeds upon Parpart welding machines built in accordance with Patent No. 658,741 and upon machines built in accordance with my patent application, Serial No. 590,884, in both of which machines the work is traversed through suitable supporting and guiding devices past a pair of roller electrodes which contact with the work upon opposite sides of the seam-cleft closely adjacent thereto, and pressure is applied to close the seam-cleft substantially in the plane of contact of the electrodes with the work.

Among the advantages of my invention are:—

Small electrical loses between the welding transformer and the work due to the direct contact of the work with the stationary terminals of the welding circuit without intervening revoluble or other moving electrodes; simplified construction employing the smallest possible number of joints in the welding circuit; substantial reduction in electric power and energy requirements compared to other methods and apparatus on account of the decreased voltage "drop" between the welding transformer and the work; substantial savings both in the first cost of the machine and in repairs and maintenance due to the avoidance of the use of collector rings and brushes; my invention may be embodied in a machine constructed without any sliding electric contacts; a large range of sizes of work may be handled in the same machine; and, by the use of my invention, electric welding may be extended to new fields of usefulness.

The foregoing and other objects and advantages are attained by the use of my invention described in this specification and shown in the accompanying drawings, in which:—

Fig. 1 is a side elevation of a machine built in accordance with my invention and adapted to progressively butt weld the edges of metal sheets or the like;

Fig. 2 is a fragmentary vertical cross section on line II—II of Fig. 1;

Fig. 3 is a vertical cross section through the machine on line III—III of Fig. 1;

Fig. 4 is a portion of Fig. 3 drawn to a larger scale;

Fig. 5 is a fragmentary vertical cross section on line V—V of Fig. 1 but drawn to a larger scale;

Fig. 6 is a vertical cross section on line VI—VI of Fig. 3;

Fig. 7 is a fragmentary view showing a modification of the pressure roller bar mounting;

Fig. 8 is a view similar to Fig. 7 showing a further modification of the pressure roller bar mounting;

Fig. 9 is a fragmentary view showing another form of pressure roller bar;

Fig. 10 is a section on line X—X of Fig. 1;

Fig. 11 is a fragmentary plan view on line XI—XI of Fig. 3;

Fig. 12 is a fragmentary section on line XII—XII of Fig. 7; and

Fig. 13 is a section on line XIII—XIII of Fig. 9.

Referring to the drawings, a welding transformer 1 of any suitable internal construction and electrical connections may be employed. Usually, transformers for this class of welding are provided with single turn secondary windings adapted to develop from two to six volts depending upon the thickness of the stock to be welded and the speed at which it is to be welded. The primary windings of the transformer may be energized from any suitable source of alternating current such as the ordinary service lines at the customary potentials. The secondary 2 of the transformer will preferably have its terminals 3—4 suitably formed to be supported by the transformer top housing 5 from which it should be suitably insulated as shown at 6 in Fig. 3. Ducts $3^a$—$4^a$ may be formed in the terminals 3—4, through which a cooling fluid may be circulated in known manner. Bolts 7 may be used for securing the transformer secondary to the top housing 5 and these bolts should also be suitably insulated so as not to short circuit the secondary winding. The transformer core 8, core clamps $8^a$—$8^b$, secondary coil 2 and primary coils 9 may be insulated in known manner and may be supported by the secondary conductor casting as shown in the drawings, or other means may be provided for supporting them such, for instance, as the ribs 10 projecting inwardly from the walls of the main housing 11 of the transformer and engaging the core clamps 8$^b$. The top housing 5 may be removably secured to the main housing 11 by means of bolts 12. It will be understood that it is important to have the secondary terminals 3—4 accurately aligned and positioned and firmly held in fixed position. The transformer may be oil, air blast or otherwise cooled if desired. Cooling-fluid ducts such as 3$^b$—4$^b$ may be provided in the secondary terminal electrodes if desired.

The secondary terminals 3—4 of the transformer may be provided with flanges 13—14, accurately machined to contact with and support the electrode bars 15—16. Insulation 17, such, for instance, as bakelite, may be interposed between the opposite faces of the terminals 3—4 and electrode bars 15—16. Insulated through-bolts 18 may be employed to clamp the terminal flanges 13—14, electrode bars 15—16 and insulation 17 firmly together. Cap screws 19—20 may be employed to draw the electrode bars 15—16 into good electrical contact with the flanges 13—14 of the transformer secondary terminals. Renewable work-contacting strips 21—22 may be detachably secured to the electrode bars 15—16 by suitable means such as the cap screws 23—24.

The electrode bars 15—16 and the strips 21—22 may be made of any desired or necessary length to accommodate the work to be welded. It will be understood that the work-contacting strips 21—22 may be dispensed with if desired and the work may be made to contact directly with the tops of electrodes 15—16. In such instance, however, the electrodes should be shaped so as to be spaced about an eighth of an inch apart adjacent to the work seam-cleft, as the work-contacting strips are shown spaced at 25. The space 25 between the opposite edges of the electrode contact surfaces may be varied somewhat with the thickness of the work as in the known use of roller electrodes.

Provision should be made for supporting and clamping the work and for pressing the contacting surfaces of the seam-cleft together. In the drawings, work platens 26—27 are disposed upon opposite sides of the electrodes and extend toward them over the transformer as shown in Fig. 3. They may be mounted upon pedestal extensions 28—29 which may be secured to the transformer housing base 11 or they may be supported direct from the floor or other suitable support.

For holding the work and for pressing the edges firmly together, I prefer to employ pairs of rollers 30—31 and 32—33 having shafts such as those shown at 34—35 in Fig. 6 mounted in adjustable bearings 36—37 and held in adjusted position by means such as the step screws 38—39. The top rollers 31—33 may have their shafts extended and ratchet wheels 40 may be mounted upon and secured to the shafts. Suitable levers 41—42 may be provided and pawls 43—44 may be pivotally secured to the levers by means of bolts 45. Reversible pawls 43—44 may be provided to engage the teeth of ratchet wheels 40 (preferably, there should be a ratchet wheel mounted on each end of the shafts of rolls 31—33) for rotating the rolls in either direction, or, the pawls may be disengaged from the ratchet wheels and the rolls may then be allowed to rotate freely as, for instance, when the work is being fed through the rolls before and after making a weld.

Springs 46—47 or equivalent means may be employed to exert yielding torsional force upon the levers 41—42 and the co-acting rolls 31—33 respectively to produce yielding feeding pressure upon the work sheets 48—49 to force the contacting edges of the seam-cleft 50 together.

Series of spring-actuated plungers 51—52 may be employed for the purpose of holding the work slightly above and out of contact with the tops of the electrodes or contacting strips 21—22 until the pressure-roller 53 engages the work and forces it down into good electrical contact with them. The spring-actuated plungers 51—52 may be mounted in suitable apertures in the work platens 26—27, as shown in Fig. 3. A film of oil may be smeared on the electrode surfaces or on the surfaces of the work that are to be pressed into contact with the electrodes to prevent arcing between the electrodes and the work where they may come together outside the zone of the localized pressure.

Preferably, a steel roller 53 or a pair of insulated rollers should be employed for pressing the work into good electrical contact with the electrodes or the contacting strips 21—22 if they be used. In the machine shown in the drawings a single roller 53, preferably made of steel, is used, having a circumferential groove 53$^a$ in the middle of its face. This groove 53$^a$ spans the seam-cleft 50 of the work opposite the space between the electrodes so that the roller 53 operates to press upon the work upon the opposite sides of the seam-cleft as a pair of axially spaced-apart rollers mounted upon a shaft would operate. If desired a pair of rollers may be used and they may be insulated from each other by insulation in the place of groove 53$^a$ and may be suitably insulated from the shaft 53$^b$ in known manner. It is not essential that the halves of roller 53 be insulated from each other for the reason that the impedance of the current path through the work across the seam-cleft between the electrodes is so much less than that through roller 53, around the bottom of the groove 53ᵃ that sufficient current will flow through the work across the seam-cleft to weld it although the pressure roll halves be not insulated from each other. The use of insulated rollers will prevent a certain wastage of electric current.

The purpose of the pressure roller 53 is to press the work immediately between it and the electrodes into good electrical contact with the electrodes or the contacting strips 21—22 if they be employed. This will cause electric current of great density and volume to flow across the seam-cleft between the electrodes in the narrow zone of pressure created by the roller 53. To weld the seam, the roller 53 is traversed along the work, progressively pressing it into good electrical contact with the electrodes adjacent to and parallel with the seam-cleft. The flow of current, which is concentrated largely in the zone of the localized pressure of the roller 53 because the path of least resistance between the electrodes lies in that zone, heats the contacting surfaces of the seam-cleft and progressively welds them together coincidentally with the movement of the zone of pressure. It will be understood that the same effect may be had if the roller 53 be held in one position and the work and the electrodes be traversed past it, relative traversing movement of the localized pressure of the work upon the electrodes along the seam-cleft being what is required.

Various means may be employed to force the pressure roller against the work and cause it to move progressively along the seam-cleft. One of such means is illustrated in Figs. 1 and 3 and various modifications of this means are illustrated in Figs. 7, 8 and 9.

In Figs. 1 and 3 the pressure roller 53 is shown revolubly supported in bearings in a pressure roller support 54 which is secured to a supporting bar 55 which is mounted for sliding movements in adjustable bearings 56. The bearings 56 are mounted in a suitable housing 58 which may be supported upon a rigid base frame or pedestal 59. To reciprocate the bar 55 longitudinally in its bearings and thereby cause the pressure roller 53 to progressively engage and press the work into good electrical contact with the electrodes, I prefer to employ such a mechanism as is illustrated in Fig. 1 in which a rack bar 60 is connected as at 61 to the roller support 54 so as to permit vertical adjustments of the latter. Rack bar 60 and the contact pressure applying and traversing means, including roller 53, may be reciprocated back and forth longitudinally of itself by means of a suitable train of reduction gearing driven by the motor 62 or other suitable means. The motor 62 may be mounted upon the pedestal 59 and its motion may be transmitted to the rack bar 60 by the worm 63, worm wheel 64, gears 65 and 66, and pinion 67, in well known manner. The motor 62 or other driving means should be reversible and may be controlled in any suitable known manner. Suitable known adjustable stops and limit switches may be employed for stopping the motor and the traversing movement of the pressure roller and for opening the primary circuit of the welding transformer 1 at or near the ends of its travel.

The electrode bars 15—16 may be attached to the housing 58 to give them additional support and rigidity. It will be understood that they should be insulated from their supports (except the transformer secondary terminals) and from each other. In Figs. 1 and 10, insulated bolts 68—69 are shown passing through the electrode bars and flanges 70 formed on housing 58 for aiding in supporting the electrodes and in holding them in accurate position and in alignment with the path of movement of pressure roller 53. The work platens 26—27 may be provided with legs 71 and foot flanges 72 which may be mounted upon the supporting pedestals 28—29 in suitable manner.

Suitable ducts 73, 74, 75, may be provided in the shaft 53ᵇ and pressure roller support 54, for the circulation of cooling fluid, in known manner.

In Figs. 1 and 2 the bar 55 is shown mounted in adjustable bearings adapted to support the bar against transverse horizontal and vertical movements but to permit it to slide in the housing 58. The bearing blocks 56 are tapered as shown at 76 to fit complemental gibs 57 and have lugs 77 with clearance apertures for studs 78 which are secured in the housing 58. By adjusting nuts 79—80 which abut against the lugs 77, the bearing blocks may be adjusted to raise, lower and align the bar 55 and consequently roller 53. Adjustable side bearing blocks 81—82 may be provided for supporting the bar 55 against horizontal transverse movement in housing 58. For the adjustment of blocks 81—82, set screws 83 may be employed in well known manner.

Bearing blocks 84 may be provided for rack bar 60 as shown in Figs. 1 and 2. The rack bar may have side flanges 85 to support it in suitable apertures in housing 58.

In Fig. 7, the top bearings 86—86 of the pressure roller bar 87, are yieldingly held against upward movement by springs 88. Spring tension adjusting screws 89 may be provided by which the maximum pressure of roll 53 on the work may be predetermined. Adjustable non-yielding bearing blocks 90 and gibs 91 may be employed for limiting the downward movement of bar 87 and roller 53.

In Fig. 8 the adjustable non-yielding bearing blocks 92 and gibs 93 are disposed above the pressure roller bar 94 while springs 95—96 yieldingly support the bar in contact with bearings 92 and prevent roller 53 from dropping down upon electrode contact strips 21—22 when the roller is traversed beyond the work 97.

In Fig. 9 the pressure roller bar 98 is stationary. One end is fixed to the housing 99 and the other is connected by a pivoted link 100 to the support 101 which supports the outer end of the electrode bars. The pressure roller support 102 slides on the bar 98 and may be traversed back and forth by the rack bar 103 which is actuated by pinion 104 and the driving mechanism as shown.

The pivoted link 100 is detachably connected to the support 101 and may be swung up about the pivot 100ª, to permit the work to be placed in the machine over the ends of the electrodes. With this construction of machine, longitudinal seams in cylinders may be welded as the cylinders can be readily placed upon and removed from the electrodes by swinging link 100 up out of the way.

In Fig. 12 the insulated support for the electrodes shown in Figs. 7 and 8 is shown in section. The electrode bars 105—106 are separated by insulation 107. Insulations 108—109 insulate the electrodes 105—106 from the frame 110. Set screws 111 may be provided for aligning and securing the electrodes in the frame 110 as shown.

Fig. 13 is a section on line XIII—XIII of Fig. 9 showing the manner in which the ends of the electrode bars 112—113 are supported and insulated in the frame 101. The electrodes are insulated from each other and from the frame as clearly shown in Fig. 13.

In the operation of my invention, the work plates such as those shown at 48—49, Fig. 3, are preferably clamped upon the platens 26—27 with the surfaces of the seam-cleft 50 in accurate meeting register and firmly pressed together.

In the drawings I have illustrated a machine having straight surfaced electrodes, but it will be obvious to those skilled in the art that they may be curved to accommodate correspondingly curved sheets such as are used in making metal bodies for automobiles, metal receptacles or other bulged sheet articles.

While I have shown and described my invention as utilizing alternating electric current, it will be understood that any other suitable form of electric current, such for instance as continuous or impulsive unidirectional current may be employed if suitable sources of supply of such kinds of current are available.

I do not limit my invention to the specific apparatus shown in the drawings or to the specific operations described, as it will be obvious to those skilled in the art that other means may be employed for carrying out my invention and that the functions of its elements may be augmented or modified without departing from its scope.

I claim:—

1. A method of welding together the contacting surfaces of an open butt-seam in metal which consists in pressing said contacting surfaces together, causing the metal adjacent to and upon opposite sides of the seam-cleft to contact with the respective opposite terminals of an electric welding circuit, applying localized pressure to said metal upon opposite sides of the seam-cleft to press small areas of the surfaces of said metal into good electrical contact with said terminals adjacent to the seam-cleft, and progressively traversing said localized pressure of the metal upon said terminals parallel and adjacent to the seam-cleft.

2. A method of welding together the contacting surfaces of an open butt-seam in metal which consists in pressing said contacting surfaces together, applying localized pressure to said metal adjacent to and upon opposite sides of the seam-cleft to press small areas of the surfaces of said metal into good electrical contact with the terminals of an electric welding circuit whereby the flow of current between said terminals is largely concentrated in a narrow path in the metal across the seam-cleft between said areas of localized pressure, and causing progressive traversing movement of the localized pressure of the metal upon said terminals parallel and adjacent to the seam-cleft.

3. In apparatus for progressively welding together the contacting surfaces of an open butt-seam in metal, parallel spaced-apart electrodes co-extensive with the seam to be welded adapted to support the work to be welded with the surfaces of the seam-cleft in abutting register opposite and centrally of the space between the electrodes, means for applying localized pressure to the work upon opposite sides of the seam-cleft to press small areas of the surfaces of the work into good electrical contact with said electrodes, and means for causing progressive traversing movement of the localized pressure of the work upon said electrodes parallel and adjacent to said seam-cleft.

4. In apparatus for progressively welding together the contacting surfaces of an open butt-seam in metal, parallel spaced-apart electrodes co-extensive with the same to be welded adapted to support the work to be welded with the surfaces of the seam-cleft in abutting register opposite and centrally of the space between the electrodes, means for pressing said contacting surfaces together, means for applying localized pressure to the work upon opposite sides of the seam-cleft to press small areas of the work into good electrical contact with said electrodes, and means for causing progressive traversing movement of the localized pressure of the work upon said electrodes parallel and adjacent to said seam-cleft.

5. In apparatus for progressively welding together the contacting surfaces of an open butt-seam in metal, parallel spaced-apart electrodes-co-extensive with the seam to be welded adapted to support the work to be welded with the surfaces of the seam-cleft in abutting register opposite and centrally of the space between the electrodes, yielding means for supporting the work out of contact with said electrodes, means for applying localized pressure to the work upon opposite sides of the seam-cleft in opposition to said yielding means to press small areas of the surfaces of the work into good electrical contact with said electrodes, and means for causing progressive traversing movement of the localized pressure of the work upon said electrodes parallel and adjacent to said seam-cleft.

6. In apparatus for progressively welding together the contacting surfaces of an open butt-seam in metal, parallel spaced-apart electrodes co-extensive with the seam to be welded adapted to support the work to be welded with the surfaces of the seam-cleft in abutting register opposite and centrally of the space between the electrodes, means for yieldingly supporting the work out of contact with said electrodes, means for pressing together the contacting surfaces of the seam-cleft, means for applying localized pressure to the work upon opposite sides of the seam-cleft in opposition to said yielding means to press small areas of the work into good electrical contact with said electrodes, and means for causing progressive traversing movement of the localized pressure of the work upon said electrodes parallel and adjacent to said seam-cleft.

7. In apparatus of the class described, a source of supply of electric welding current, a pair of parallel spaced-apart electrodes connected to the terminals of said source of current supply, means for supporting the work with the surfaces of the seam-cleft in abutting register opposite and centrally of the space between the electrodes, and means for progressively applying localized pressure to the work upon opposite sides of the seam-cleft to progressively press small areas of the surfaces of the work into good electrical contact with said electrodes.

8. In apparatus of the class described, a transformer, a pair of parallel spaced-apart electrodes electrically connected to the secondary terminals of said transformer adapted to support the work to be welded with the surfaces of the seam-cleft in abutting register opposite and centrally of the space between the electrodes, roller means for applying localized pressure to the work upon opposite sides of the seam-cleft to press small areas of the surfaces of the work into good electrical contact with said electrodes, and means for causing progressive traversing movement of said roller means along the work parallel and adjacent to said seam-cleft.

9. In apparatus for progressively welding together the contacting surfaces of an open butt-seam in metal, parallel spaced-apart electrodes co-extensive with the seam to be welded adapted to support the work to be welded with the surfaces of the seam-cleft in abutting register opposite and centrally of the space between the electrodes, means for applying localized pressure to the work upon opposite sides of the seam-cleft to press small areas of the surfaces of the work into good electrical contact with said electrodes, means for varying said localized pressure, and means for causing progressive traversing movement of the localized pressure of the work upon said electrodes parallel and adjacent to said seam-cleft.

FRANK L. SESSIONS.